Aug. 10, 1965    L. R. YESKE    3,199,279
AGRICULTURAL IMPLEMENT
Filed March 31, 1964    2 Sheets-Sheet 1

INVENTOR.
LAUREL R. YESKE.
BY Emerson B Donnell ATTY
Robert O. Goddard    AGT

Aug. 10, 1965 L. R. YESKE 3,199,279
AGRICULTURAL IMPLEMENT
Filed March 31, 1964 2 Sheets-Sheet 2

INVENTOR.
LAUREL R. YESKE.

3,199,279
AGRICULTURAL IMPLEMENT
Laurel R. Yeske, Rockford, Ill., assignor to J. I. Case Company, Racine, Wis., a corporation of Wisconsin
Filed Mar. 31, 1964, Ser. No. 356,217
12 Claims. (Cl. 56—305)

This invention relates to agricultural implements and more particularly to cutter bars of the type usually used in mowers, grain harvesting equipment and the like, and an object of the invention is to generally improve the construction and operation of these devices, the invention relating especially to the hold-down clips which are used for resiliently holding the knife sections in proper shearing relation to the stationary cutting means on the cutter bar.

A cutter bar of this nature, as is well known, consists of a long heavy rigid bar which is propelled through the crop to be harvested in a position transverse, or usually at right angles to the direction of movement. Along its leading edge, it has a plurality of forwardly directed cutting elements or guards, with which cooperate a series of cutting elements or sickle sections fixed to a reciprocating rod or shaft so that the individual sections may each cooperate with one or more of the guards to form a series of shearing devices. It is necessary to maintain the reciprocating sickle sections in proper shearing relation to the stationary guards, and this is commonly accomplished by a means of spring clips fixed in relation to the cutter bar and arranged to press downwardly on the moving sickle sections in a relatively gentle and resilient manner. Such devices have been characterized by a lack of uniform pressure of the individual sickle sections on their respective guards, and by a lack of sufficient flexibility in the spring clips. Furthermore, the degree of pressure of the spring clips has been difficult of adjustment, this operation having been performed by peening the springs with a hammer. In view of this difficulty, such cutting mechanisms, in many cases, have been allowed to run in poorly adjusted condition with consequent poor cutting efficiency, unnecessary poor operation of the cutting mechanism, and all around low efficiency.

Prior structures also have had protruding parts which tended to catch crop material and cause it to accumulate undesirably on the cutter bar.

It is accordingly, a principal object of the invention to provide a clip which is flexible, which is easily adjusted, which holds its adjusted position, which gives uniformly distributed pressure along the length of the cutter bar, and which is well adapted to allow crop material to flow over it without catching.

The manner in which this object is accomplished is fully set forth in the following specification and illustrated in the accompanying drawings, in which.

Figure 1:
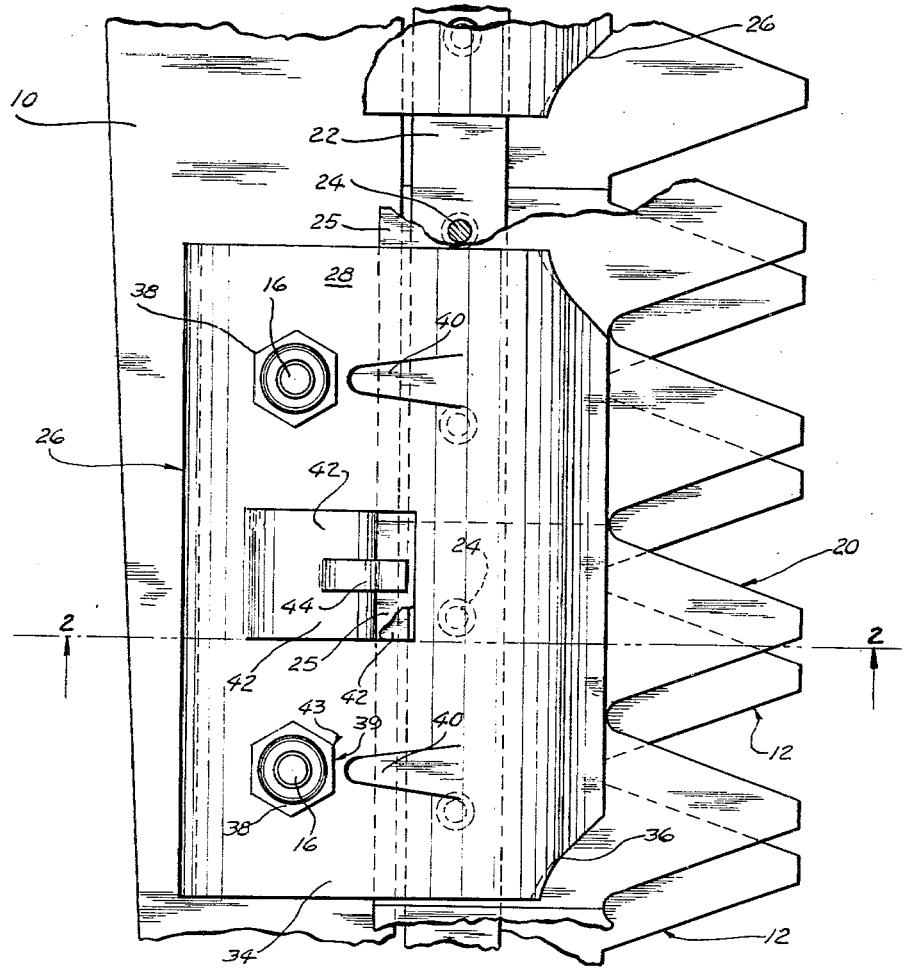
FIG. 1 is a fragmentary plan view of a short section of a cutter bar sufficient to show one of the clips, other parts of the bar being broken away to show what lies beneath.

The cutter bar to which the improved clip is attached comprises basically a heavy bar 10, supported in any well-known manner on a suitable propelling vehicle, not shown, projecting outwardly therefrom, and usually of gradually reducing width toward its outer or unsupported end, although in the case of a combine or the like the bar may take any convenient form, and is usually fastened along the length of the header structure in a manner well known and forming no part of the invention. Bar 10 has attached thereto a large number of cutting elements or guards, one of which is shown in section in FIG. 2 as 12. Guard 12 has a portion 14 rigidly clamped to the underside of bar 10 by a bolt 16, which extends upwardly through bar 10 and has a nut 18 by which portion 14 and bolt 16 are drawn forcibly together, fastening portion 14 to bar 10 in rigidly clamped relation. Bolt 16 extends upwardly beyond nut 18 for a purpose to appear.

Guards 12 have cooperating therewith, cutting means or sickle sections 20 which are arranged in a series along the length of a reciprocating rod or shaft 22, which lies along the length of bar 10, said sickle sections being affixed to rod 22 by means of rivets 24 and overhanging rearwardly thereof to form a ledge 25. As will be apparent, reciprocation of rod 22 will cause sickle sections 20 to move in shearing relation with guards 12 so that crop material which comes between the sickle sections and guards will be cut off to flow backwardly over the cutter bar. Perhaps it might be said more properly that the crop remains approximately in its original spot while the cutter bar passes beneath.

As will be understood, it is important that sickle sections 20 shall be pressed into sliding contact with guards 12 in order to maintain a true shearing action between these elements. However, the pressure must not be so great as to introduce an undue frictional drag between the parts, and this is commonly achieved by some kind of spring clips which press downwardly on the sickle sections in sliding contact therewith. As heretofore suggested, for best results this pressure must be "just right."

Figure 2:
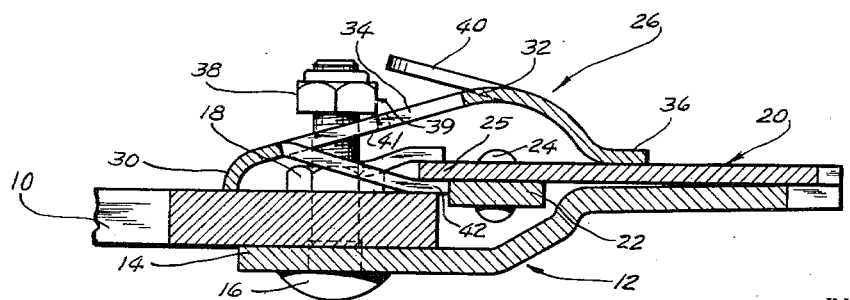
FIG. 2 is a vertical cross section on the line 2—2 of FIG. 1.

In the present device, a plurality of spring clips are used, one of which is generally designated as 26. Clips 26 are made from substantially rectangular plates 28, in the preferred embodiment of spring steel, although other materials of similar properties are contemplated as available for the purpose. Plate 28, as best seen in FIG. 2, has a downwardly directed rear edge 30, an upwardly arched portion 32, and between the latter, a relatively flat connecting portion 34. Forwardly of arched portion 32, plate 28 bends downwardly and forwardly in the form of a forward lip 36. The latter is smooth on its underside and the upper surfaces of sickle sections 20 slide back and forth beneath it, lip 36 constituting on its under side, a bearing surface in contact with sickle sections 20.

Bolt 16, of which two are shown, extends upwardly through a suitable opening in plane portion 34 of plate 26 and has, in addition to nut 18, a lock-nut 38 which, when turned down on bolt 16, forcibly engages flat portion 34 so as to press down on it and therefore on clip 26, thereby slightly deforming plate 28 so as to introduce spring pressure into lip 36 due to the resilient nature of the plate.

As will be apparent, nuts 38 may be readily adjusted to make the downward pressure of lip 36 as heavy or as light as desired. In the action of the parts, downwardly directed edge 30 acts as a fulcrum about which plate 28 would rock if downward movement of lip 36 should be possible, and plate 28 would so rock if there is any up-and-down component of movement in sickle sections 20, either by variation in thickness of sickle sections 20, or because of any irregularity in guards 12. Actually, since edge 30 is fixed in position by contact with bar 10, plate 28 cannot rock, but must flex in the event of upward movement of sickle sections 20, since upward movement of the flat connecting portion 34 is prevented by contact with nut 38. Nut 38 is preferably hexagonal in shape, and when in fixed position has one of its flat sides 39 presented toward connecting portion 34, the lower edge 41 of said flat side 39 forming a knife-edge type of pivot or fulcrum with sloping flat connecting portion 34 and about which said connecting portion may rock in connection with its flexing movement. In this way, the fleing movement is made very free, and there is no variation thereof by reason of varying contact with nut 38. Furthermore, the upward pressure of portion 34 against the lower edge 41 provides an automatic locking effect for the nut, since any turning of the latter requires further downward flexing of portion 34 in order to permit passage of one of the lower corners 43 of nut 38. Such resistance to turning is easily overcome by a wrench, however, and the nut will stay in substantially any position to which it is adjusted, without any attention on the part of the operator.

Nuts 38, projecting as they do above the level of plate 28, would form a serious encumbrance to crop material through which the cutter bar was passing and an invitation to "hairpin wrapping" of long straws, which as well known, is undesirable. In order to eliminate this tendency, plate 28 is lanced to form tongues 40 which are struck up from the upper surface of the arched portion 32 and extend rearwardly in a direct line with nuts 38, terminating at an elevation somewhat higher than that of the nuts and bolts 16. Tongues 40 therefore guide crop material to a position where it will pass over, and not wrap about nuts 38.

As hereinbefore stated, sickle sections 20 extend backwardly beyond rod 22 to form a ledge 25, and this is used to support the rear portion of sections 20 out of contact with bar 10. A tongue 42 is lanced from plate 28 and depressed so that it rests on the upper surface of bar 10, extending forwardly from a region somewhat to the rear of, and between bolts 16. Tongue 42, as stated, rests upon bar 10 and preferably extends slightly forwardly thereof so that ledge 25 formed by the rear edges of sections 20 rests upon the upper side of tongue 42 in sliding contact therewith. Furthermore, tongue 42 extends into sliding contact with the rear edge of rod 22. By this means, a readily renewable guide or sliding bearing is provided for sickle sections 20, and which is made of a material which is very durable and will give a satisfactory useful life to the parts. Furthermore, it will avoid any wear or deterioration of the main bar 10. The usual backward pressure against sections 20 is also taken on the front edge of tongue 42, rather than on bar 10, it being understood that the complete cutter bar will have a substantial number of clips 26, and therefore of tongues 42 along the length thereof. In this way, bar 10 is saved from any wear occasioned by the action of sickle bar 22 or sickle sections 20.

From time to time, upward forces are exerted on sickle sections 20 of a greater magnitude than it would be feasible to resist by spring clips 26. To withstand such unusual upward forces, tongue 42 is lanced near its center, and a finger 44 is struck up from tongue 42 so as to provide a space between the forward end of tongue 42 and finger 44, in which ledge 25 plays back and forth, normally resting on tongue 42 in sliding engagement therewith. However, in the event of an unusual force, such as that arising from striking a rock, stick, or the like, edge 25 may not rise appreciably from its normal position without contacting finger 44. As stated, plate 28, and therefore all of the various lips, fingers, tongues, etc., made of spring steel or something similar so that the several parts are extremely rigid and rugged and well adapted to support and control sickle bar 20 in the manner described.

Figure 3:
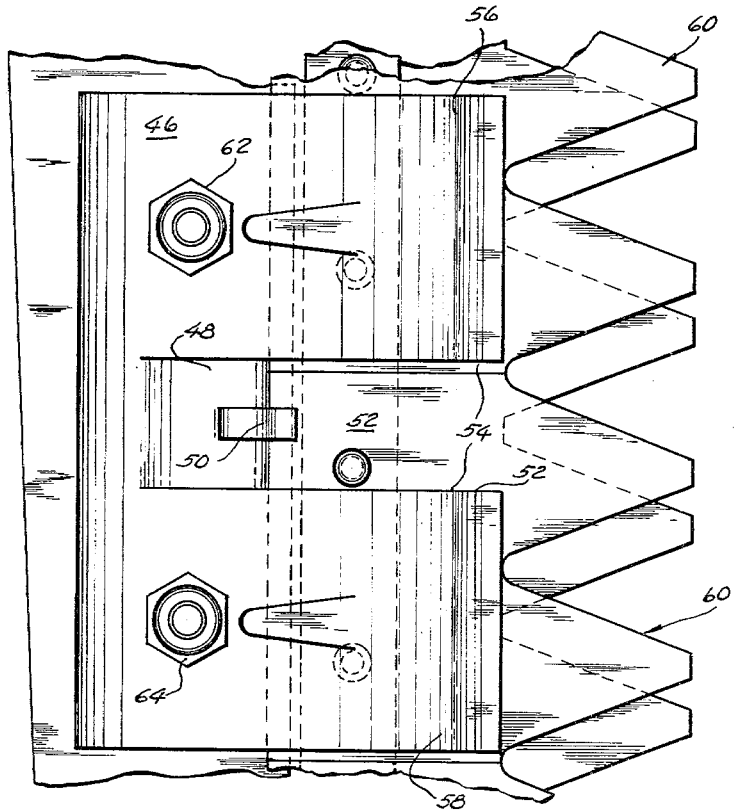
FIG. 3 is a view similar to FIG. 1 showing a modification.

It should be apparent that variations in the details of the hold-down clip may occur to those skilled in the art and are contemplated as within the scope of this invention. For example, as seen in FIG. 3, a plate 46 is lanced to form a tongue 48. However, the cuts extend all the way to the front edge of the plate 46. Thus, plate 46 has a tongue 48 with a finger 50 for the same purpose as tongue 42 and finger 44 in FIG. 1. However, the opening made in plate 46 in forming tongue 48 is extended forwardly in the form of a notch 52, entirely through the front edge of the plate, resulting in two lips 54. This results in two sections 56 and 58 of plate 46, which press down independently or approximately so, on sickle sections 60. In view of the lancing of plate 46, sections 56 and 58 are to a large extent independent of each other, and subject to individual adjustment by means of their respective nuts 62 and 64. Also in the event of more than the usual irregularity in sickle sections 60, the pressure is more evenly divided between the several sections than might be the case with the previously described single wide plate 28.

The operation of the invention is thought to be clear from the above, sufficient to say, clips 26 press downwardly gently on sickle sections 20, the exact pressure being readily controlled by adjustment of nuts 38. Sickle sections 20 rest with their rear edges 25 on tongues 42 struck downwardly from clips 26 so as not to exert a wearing effect on bar 10. Also backward pressure of sickle bar 22 is taken on tongues 42 rather than bar 10. Any upward thrust on sickle sections 20 is resisted by fingers 44 so that the downward spring pressure of clips 26 need not be excessive.

"Hairpin wrapping" or the collection of debris on nuts 38 is prevented by tongues 40 which guide the material safely to the rear of these adjusting nuts.

When nuts 38 are adjusted they will tend to come to rest with their flat sides toward the front or toward sloping flat portion 34 and will be yieldingly locked in this position by the resilient upward pressure of the spring clips 26.

It will be apparent that a construction has been devised which will fully accomplish the objects of the invention, and what is claimed as new and desired to be secured by Letters Patent of the United States is:

1. A hold-down clip for a cutter bar having a mower knife of the type comprising an elongated rod with a series of forwardly directed knife blades fixed on the upper side thereof, and extending forwardly and rearwardly from said rod, said clip comprising a rectangular plate of resilient material defining an upwardly arched mid portion having a forwardly directed lip extending in a direction substantially parallel to said elongated rod, and resting on the upper surfaces of said knife blades, said arched portion extending rearwardly and bending down at a point spaced behind said knife blades and said rod, into contact with said cutter bar rearwardly of mower knife, a bolt anchored in said cutter bar and extending upwardly through said upwardly arched mid portion, a nut on said bolt adjustable into downwardly pressing relation with said upwardly arched mid portion, and a tongue struck downwardly from said plate from a point at the rear of the region of said bolt, said tongue extending forwardly beneath the rear edges of said knife blades.

2. A hold-down clip for a cutter bar having a mower knife of the type comprising an elongated rod with a series of forwardly directed knife blades fixed on the upper side thereof, and extending forwardly and rearwardly from said rod, said clip comprising a rectangular plate of resilient material defining an upwardly arched mid portion having a forwardly directed lip extending in a direction substantially parallel to said elongated rod, and resting on the upper surfaces of said knife blades, said arched portion extending rearwardly and bending down at a point spaced behind said knife blades and said rod, into contact with said cutter bar rearwardly of said mower knife, a bolt anchored in said cutter bar and extending upwardly through said upwardly arched mid portion, a nut on said bolt adjustable into downwardly pressing relation with said upwardly arched mid portion, and a tongue struck downwardly from said plate from a point at the rear of the region of said bolt, said tongue extending forwardly beneath the rear edges of said knife blades and into guiding contact with the rear surface of said rod.

3. A hold-down clip for a cutter bar having a mower knife of the type comprising an elongated rod with a series of forwardly directed knife blades fixed on the upper side thereof, and extending forwardly and rearwardly from said rod, said clip comprising a rectangular plate of resilient material defining an upwardly arched mid portion having a forwardly directed lip extending in a direction substantially parallel to said elongated rod, and resting on the upper surfaces of said knife blades, said arched portion extending rearwardly and bending down at a point spaced behind said knife blades and said rod, into contact with said cutter bar rearwardly of said mower knife, a bolt anchored in said cutter bar and extending upwardly through said upwardly arched mid portion, a nut on said bolt adjustable into downwardly pressing relation with said upwardly arched mid portion, a tongue struck downwardly from said plate from a point at the rear of the region of said bolt, said tongue extending forwardly beneath the rear edges of said knife blades and into guiding contact with the rear surface of said rod, said tongue having a central finger struck upward from its front edge and extending over the rear edges of said knife blades to secure said knife blades against being raised at their rear edges.

4. A hold-down clip for a cutter bar having a mower knife of the type comprising an elongated rod with a series of forwardly directed knife blades fixed on the upper side thereof and extending forwardly and rearwardly from said rod, said clip comprising a rectangular plate of resilient material defining an upwardly arched mid portion having a forwardly directed lip extending in a direction substantially parallel to said elongated rod, and resting on the upper surfaces of said knife blades, said arched portion extending rearwardly and bending down at a point spaced behind said knife blades and said rod, into contact with said cutter bar rearwardly of said mower knife, a bolt anchored in said cutter bar and extending upwardly through said upwardly arched mid portion, a nut on said bolt adjustable into downwardly pressing relation with said upwardly arched mid portion, a tongue struck downwardly from said plate from a point at the rear of the region of said bolt, said tongue extending forwardly beneath the rear edges of said knife blades and into guiding contact with the rear surface of said rod, said tongue having a central finger struck upward from its front edge and extending over the rear edges of said knife blades to secure said knife blades against being raised at their rear edges by any upward force, and said plate having a finger struck upwardly and rearwardly from said upwardly arched mid portion, so as to be inclined upwardly and rearwardly to guide crop material flowing backwardly over said plate in a path to avoid catching on said nut.

5. A hold-down clip for a cutter bar having a mower knife of the type comprising an elongated rod with a series of forwardly directed knife blades fixed on the upper side thereof and extending forwardly and rearwardly of said rod, said clip comprising a rectangular plate of resilient material defining an upwardly arched mid portion having a forwardly directed lip extending in a direction substantially parallel to said elongated rod, and resting on the upper surfaces of said knife blades, said arched portion extending rearwardly and bending down at a point spaced behind said knife blades and said rod, into contact with said cutter bar rearwardly of said mower knife, a pair of bolts anchored in said cutter bar and extending upwardly through said upwardly arched mid portion, and spaced in the direction of the length of said rod, a nut on each bolt adjustable into downwardly pressing relation with said upwardly arched mid portion, said plate being lanced through its front edge to form a tongue struck downwardly from said plate from a point between and at the rear of the region of said bolts, said tongue extending forwardly beneath the rear edges of said knife blades and into guiding contact with the rear surface of said rod, said tongue having a central finger struck upward from its front edge and extending over the rear edges of said knife blades to secure said knife blades against being raised at their rear edges by any upward force, and said plate having a pair of fingers struck upwardly and rearwardly from said upwardly arched mid portion, each finger being aligned with one of said bolts and inclined upwardly and rearwardly to guide crop material flowing backwardly over said plate in a path to avoid catching on said nuts.

6. A hold-down clip for a cutter bar having a mower knife of the type comprising an elongated rod with a series of forwardly directed knife blades fixed on the upper side thereof and extending forwardly and rearwardly of said rod, said clip comprising a rectangular plate of resilient material defining an upwardly arched mid portion having a forwardly directed lip extending in a direction substantially parallel to said elongated rod, and resting on the upper surfaces of said knife blades, said arched portion extending rearwardly and bending down at a point spaced behind said knife blades and said rod, into contact with said cutter bar rearwardly of said mower knife, a pair of bolts anchored in said cutter bar and extending upwardly through said upwardly arched mid portion, and spaced in the direction of the length of said rod, a nut on each bolt adjustable into downwardly pressing relation with said upwardly arched mid portion, said plate being lanced through its front edge to form a tongue struck downwardly from said plate from a point between and at the rear of the region of said bolts, said tongue extending forwardly beneath the rear edges of said knife blades and into guiding contact with the rear surface of said rod, said tongue having a central finger struck upward from its front edge and extending over the rear edges of said knife blades to secure said knife blades against being raised at their rear edges by any upward force.

7. A hold-down clip for a cutter bar having a mower knife of the type comprising an elongated rod with a series of forwardly directed knife blades fixed on the upper side thereof and extending forwardly and rearwardly of said rod, said clip comprising a rectangular plate of resilient material defining an upwardly arched mid portion having a forwardly directed lip extending in a direction substantially parallel to said elongated rod, and resting on the upper surfaces of said knife blades, said arched portion extending rearwardly and bending down at a point spaced behind said knife blades and said rod, into contact with said cutter bar rearwardly of said mower knife, a pair of bolts anchored in said cutter bar and extending upwardly through said upwardly arched mid portion, and spaced in the direction of the length of said rod, a nut on each bolt adjustable into downwardly pressing relation with said upwardly arched mid portion, said plate being lanced through its front edge to form a tongue struck downwardly from said plate from a point between and at the rear of the region of said bolts, said tongue extending forwardly beneath the rear edges of said knife blades and into guiding contact with the rear surface of said rod.

8. A hold-down clip for a cutter bar having a mower knife of the type comprising an elongated rod with a series of forwardly directed knife blades fixed on the upper side thereof, and extending forwardly and rearwardly from said rod, said clip comprising a rectangular plate of resilient material positioned over said cutter bar and knife blades, said plate extending rearwardly into contact with said cutter bar at a point spaced behind said knife blades and said rod, and forwardly into sliding contact with the upper surfaces of said knife blades, a pair of bolts anchored in said cutter bar and extending upwardly through said plate, spaced in the direction of the length of said rod, and forwardly of the rear edge of said plate, a nut on each bolt adjustable into downwardly pressing relation with said plate, said plate being lanced through its front edge to form a tongue struck downwardly from said plate from a point between and at the rear of the region of said bolts, said tongue extending forwardly beneath the rear edges of said knife blades and into guiding contact with the rear surface of said rod, said nuts being effective respectively on the portions of said plate left outside of said tongue to press said portions into resilient contact with said upper surfaces of said knife blades.

9. A hold-down clip for a cutter bar having a mower knife of the type comprising an elongated rod with a series of forwardly directed knife blades fixed on the upper side thereof, and extending forwardly from said rod, said clip comprising a rectangular plate of resilient material positioned over said cutter bar and knife blades, said plate extending rearwardly into contact with said cutter bar at a point spaced behind said knife blades and said rod, and forwardly into sliding contact with the upper surfaces of said knife blades, a pair of adjusting bolts anchored in said cutter bar and extending upwardly through said plate, spaced in the direction of the length of said rod, and forwardly of the rear edge of said plate, a nut on each bolt adjustable up and down said bolt and into downwardly pressing relation with said plate, said plate being lanced through its front edge to a point rearward of said adjusting bolts, in position to form a pair of spaced portions, each of said spaced portions individually encompassing one of said adjusting bolts, each of said nuts being effective, respectively on one of said spaced portions of said plate to press said portion substantially independently of the other portion into resilient contact with said upper surfaces of said knife blades.

10. In a hold-down clip for a cutter mechanism of the type including a bar arranged to travel transversely of its length, a series of guards fixed on the bar projecting in a forward direction, and a series of forwardly directed reciprocatory sickle sections, said clip comprising a plate of resilient material positioned over said bar and sickle sections, said plate extending rearwardly into contact with said bar at a point spaced rearwardly of said sickle sections and forwardly into contact with the upper surfaces of said sickle sections, a bolt anchored in said bar and extending upwardly through said plate at less than a right angle thereto in all positions of said plate, spaced forwardly of the rear edge of said plate, and means on said bolt providing a downwardly directed substantially straight knife edge in contact with the upper surface of said plate and pressing down thereon to urge said plate into resilient contact with said sickle sections.

11. In a hold-down clip for a cutter mechanism of the type including a bar arranged to travel transversely of its length, a series of guards fixed on the bar projecting in a forward direction, and a series of forwardly directed reciprocatory sickle sections, said clip comprising a plate of resilient material positioned over said bar and sickle sections, said plate extending rearwardly into contact with said bar at a point spaced rearwardly of said sickle sections and sloping forwardly into contact with the upper surfaces of said sickle sections, a bolt anchored in said bar and extending upwardly through said plate at less than a right angle thereto in all positions of said plate, spaced forwardly of the rear edge of said plate, a nut on said bolt providing a plurality of downwardly directed substantially straight knife edges one of which is in contact with the upper surface of said plate and pressing down thereon to urge said plate into resilient contact with said sickle sections, other knife edges coming into contact with said upper surface of said plate as said nut is adjusted on said bolt, whereby said nut is yieldingly locked in its adjusted positions.

12. In a hold-down clip for a cutter mechanism of the type including a bar arranged to travel transversely of its length, a series of guards fixed on the bar projecting in a forward direction, and a series of forwardly directed reciprocatory sickle sections, said clip comprising a plate of resilient material positioned over said bar and sickle sections, said plate extending rearwardly into contact with said bar at a point spaced rearwardly of said sickle sections and forwardly into contact with the upper surfaces of said sickle sections, a bolt anchored in said bar normal to the direction of travel of said sickle sections and extending upwardly through said plate at less than a right angle thereto in all positions of said plate, spaced forwardly of the rear edge of said plate, a nut on said bolt providing a plurality of downwardly directed substantially straight knife edges one of which is in contact with the upper surface of said plate and pressing down thereon to urge said plate into resilient contact wth said sickle sections, other knife edges coming into contact with said upper surface of said plate as said nut is adjusted on said bolt, whereby said nut is yieldingly locked in its adjusted positions.

References Cited by the Examiner
UNITED STATES PATENTS 2,269,527  1/42  Frederiksen _____ 56—305

FOREIGN PATENTS 414,357  7/46  Italy.

ABRAHAM G. STONE, *Primary Examiner.*

RUSSELL R. KINSEY, T. GRAHAM CRAVER, ANTONIO F. GUIDA, *Examiners.*